United States Patent [19]

Oshita et al.

[11] Patent Number: 5,600,953
[45] Date of Patent: Feb. 11, 1997

[54] COMPRESSED AIR CONTROL APPARATUS

[75] Inventors: Morito Oshita, Chiryu; Masakazu Ozawa, Toyota; Masayoshi Hattori, Chiryu, all of Japan

[73] Assignee: Aisin Seiki Kabushiki Kaisha, Kariya, Japan

[21] Appl. No.: 533,746

[22] Filed: Sep. 26, 1995

[30] Foreign Application Priority Data

Sep. 28, 1994 [JP] Japan .................................. 6-233867
Sep. 29, 1994 [JP] Japan .................................. 6-235289
Aug. 8, 1995 [JP] Japan .................................. 7-202459

[51] Int. Cl.$^6$ .................................................... F16D 31/02
[52] U.S. Cl. ............................................... 60/453; 60/456
[58] Field of Search ........................... 60/407, 453, 455, 60/456, 912, 412, 494; 417/415

[56] References Cited

U.S. PATENT DOCUMENTS

| | | | |
|---|---|---|---|
| 3,633,341 | 1/1972 | Langlois | 60/453 X |
| 4,083,187 | 4/1978 | Nagashima | 60/407 |
| 4,540,382 | 9/1985 | Wilson | 417/415 X |
| 4,651,525 | 3/1987 | Cestero | 60/407 X |
| 4,836,755 | 6/1989 | Nitsche et al. | 417/415 X |
| 5,088,902 | 2/1992 | Marioni | 417/415 |
| 5,467,595 | 11/1995 | Smith | 60/412 X |

FOREIGN PATENT DOCUMENTS

| | | | |
|---|---|---|---|
| 62-69673 | 5/1987 | Japan . | |
| 2-33866 | 9/1990 | Japan . | |
| 173338 | 1/1922 | United Kingdom | 60/412 |

OTHER PUBLICATIONS

"Legacy", Service Manual of Fuji Heavy Industries Ltd., Oct. 1993, pp. 4–34 to 4–40 and 4–51.

*Primary Examiner*—Hoang Nguyen
*Attorney, Agent, or Firm*—Burns, Doane, Swecker & Mathis, LLP

[57] ABSTRACT

The invention is directed to a compressed air control apparatus for supplying compressed air to a pneumatic actuator, which includes a compressor having a head member with a pressure chamber defined therein for generating compressed air, an intake valve for introducing air into the pressure chamber, and a discharge valve for discharging the compressed air. A dryer is disposed in a dry housing to dry the compressed air discharged from the compressor. A supply solenoid valve is disposed in a supply valve housing to control the compressed air supplied to the pneumatic actuator. An exhaust solenoid valve is disposed in an exhaust valve housing to control the compressed air discharged from the pneumatic actuator. The head member, dry housing, supply valve housing and exhaust valve housing are integrally formed by synthetic resin to provide an integral housing.

13 Claims, 4 Drawing Sheets

COMPRESSED AIR CONTROL APPARATUS

BACKGROUND OF THE INVENTION

1. Field of the Invention

The present invention relates to a compressed air control apparatus, more particularly to the apparatus having an integrally molded housing for use in a vehicle height control system which is provided with a pneumatic suspension unit.

2. Description of the Prior Arts

Various pneumatic suspension units for vehicles have been known heretofore. Among them, such an apparatus having its components assembled together has been employed in a vehicle as disclosed in a service manual of "LEGACY" (Trademark of Fuji Heavy Industries Ltd.) which was issued in October, 1993, for example, pages 4–34 to 4–40 and page 4–51. The apparatus includes a compressor having a cylinder head which is made of aluminium alloy and in which an intake valve and a discharge valve are assembled, and having a motor which is connected to the compressor to drive the same for discharging compressed air to a pneumatic suspension unit. The apparatus further includes an exhaust solenoid valve which is mounted on the compressor for controlling the compressed air discharged from the pneumatic suspension unit. Also assembled to the compressor is an air dryer with a housing made of synthetic resin for drying the compressed air to be supplied to the pneumatic suspension unit. Thus, the compressor, the exhaust solenoid valve and the air dryer are assembled as one body. With respect to a supply solenoid valve for controlling the compressed air to be supplied to the pneumatic suspension unit, however, it is arranged independently, or positioned separately from the compressor and other components.

According to the prior apparatus as described above, the cylinder head of the compressor and the housing of the air dryer are formed separately and then connected with each other, so that it is necessary to apply a sealing member to the connected portion so as to provide an air tight sealing. As a result, the prior apparatus is high in cost. Furthermore, the compressor includes the intake valve and the discharge valve, both of which have components generally made of metals different from the aluminium alloy, such as a spring or the like. If moisture was introduced into the cylinder head by accident, therefore, galvanic corrosion or electrolytic corrosion might be caused thereby to deteriorate the operation of the valves.

Also disclosed in Japanese Utility-model Publication No.2-33866, is an air dryer which is disposed between a compressed air source and a pneumatic machine, such as a vehicle height control apparatus. The air dryer includes a residual valve member and a check valve which are integrally formed as a sheet-like valve. According to this air dryer, however, the dryer is formed separately from an air compressor and a valve body for supplying the atmospheric air into the compressor and discharging the compressed air, so that sealing members are needed for the respective connected portions. With respect to the air intake valve, Japanese Utility model Laid-open Publication No. 62-69673 discloses a reed valve which includes a valve plate and a bent back plate, which are overlapped with each other and secured by a bolt or the like. According to this reed valve, however, it is difficult to install it in the cylinder head of the compressor.

SUMMARY OF THE INVENTION

Accordingly, it is an object of the present invention to provide a compressed air control apparatus with a relatively small number of components and relatively low in cost.

It is another object of the present invention to provide the compressed air control apparatus having a housing integrally formed with a plurality of housing members of components.

In accomplishing these and other objects, a compressed air control apparatus for supplying compressed air to a pneumatic actuator includes a compressor which defines in a head member a pressure chamber for generating the compressed air. An intake valve is provided for introducing air into the pressure chamber, and a discharge valve is provided for discharging the compressed air. A dryer is disposed in a dry housing for drying the compressed air discharged from the compressor. A supply solenoid valve is disposed in a supply valve housing for controlling the compressed air to be supplied to the pneumatic actuator. An exhaust solenoid valve is disposed in an exhaust valve housing for controlling the compressed air to be discharged from the pneumatic actuator. With respect to the housing members, the head member, dry housing, supply valve housing and exhaust valve housing are integrally formed by synthetic resin to provide an integral housing.

Preferably, the apparatus may further include a cap member which is connected to the dry housing to define therein a dry chamber, and which is formed with a passage, one end of which is communicated with the dry chamber, and the other end of which is communicated with the pneumatic actuator.

The integral housing preferably forms therein an intake passage which communicates the intake valve of the compressor with the atmosphere, and an exhaust passage which communicates the discharge valve of the compressor with both of the dry chamber and the exhaust solenoid valve. The supply solenoid valve and the exhaust solenoid valve may be assembled next to each other so as to form a single solenoid valve unit.

Preferably, a metallic mounting member is integrally molded to the integral housing in the vicinity of the intake valve of the compressor. The intake valve may include a reed valve, one end portion of which is secured to the metallic mounting member. The compressor includes a metallic cylinder having an opening end, on which a recess is formed so as to be engaged with the other end portion of the reed valve, so that the recess allows the reed valve to move within a predetermined opening angle.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
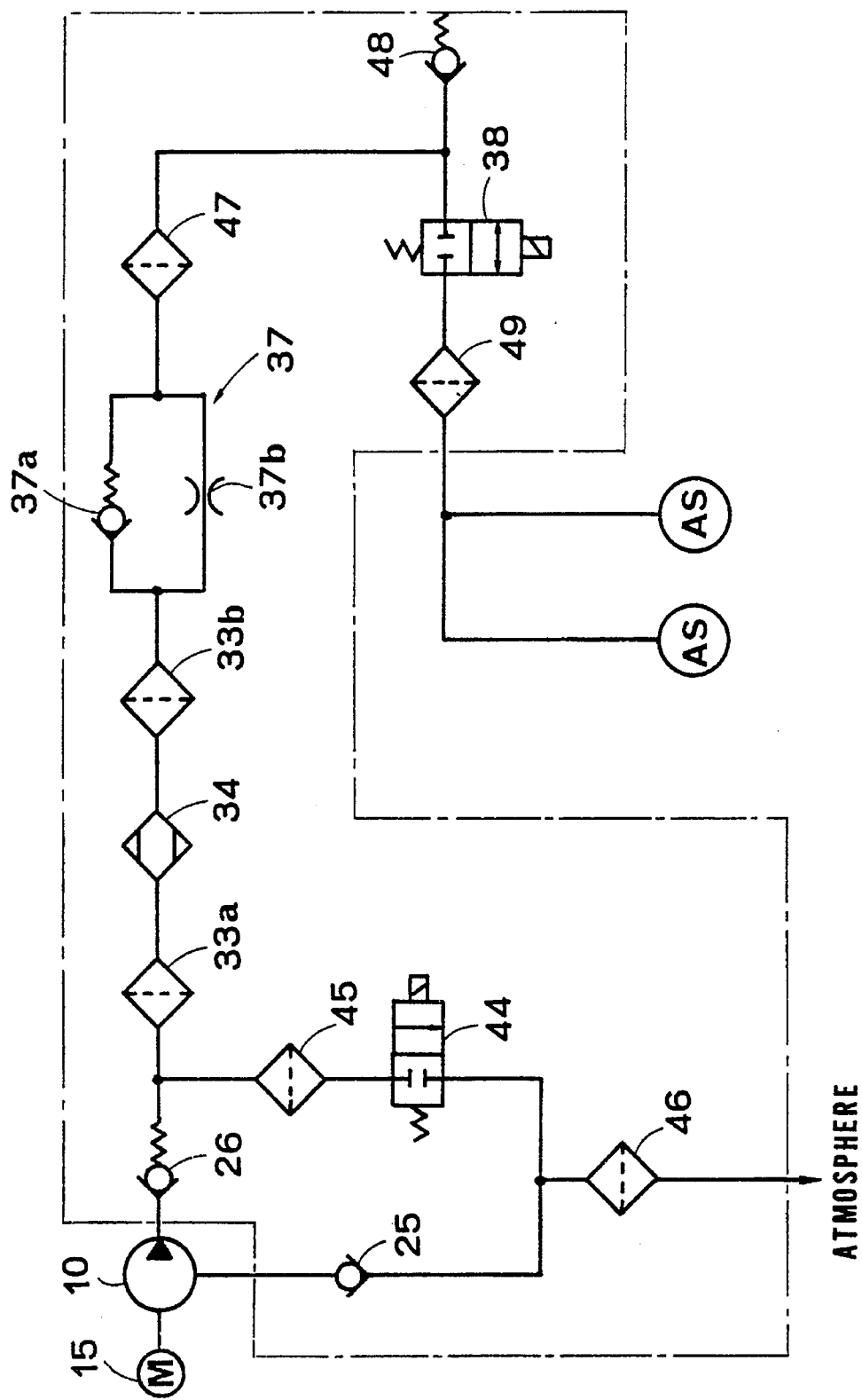
FIG. 1 is a general block diagram illustrating a compressed air control apparatus according to the present invention.

Referring to FIG. 1, there is shown an arrangement of components for a compressed air control apparatus, according to an embodiment of the present invention. A compressor 10 is operatively connected to an electric motor 15 which drives the compressor 10 to suck thereinto air from the atmosphere through a filter element 46 and an intake valve 25, and then compress the air. As arranged in FIG. 1, the air which is compressed by the compressor 10 is discharged from a discharge valve 26 and supplied into each of pneumatic suspension units AS, AS, which are provided for rear road wheels of a vehicle (not shown), through a filter element 33a, a dry room 34, a filter element 33b, a valve member 37 (i.e., a check valve 37a thereof), a filter element 47, a normally closed supply solenoid valve 38 and a filter element 49. Also, it is so arranged that the compressed air in each pneumatic suspension unit AS is exhausted to the atmosphere through the filter element 49, supply solenoid valve 38, filter element 47, valve member 37 (i.e., an orifice 37b thereof), filter element 33b, dry room 34, filter element 33a, filter element 45, normally closed exhaust solenoid valve 44 and filter element 46. Between the filter element 47 and the supply solenoid valve 38, there is disposed a relief valve 48.

Figure 2:
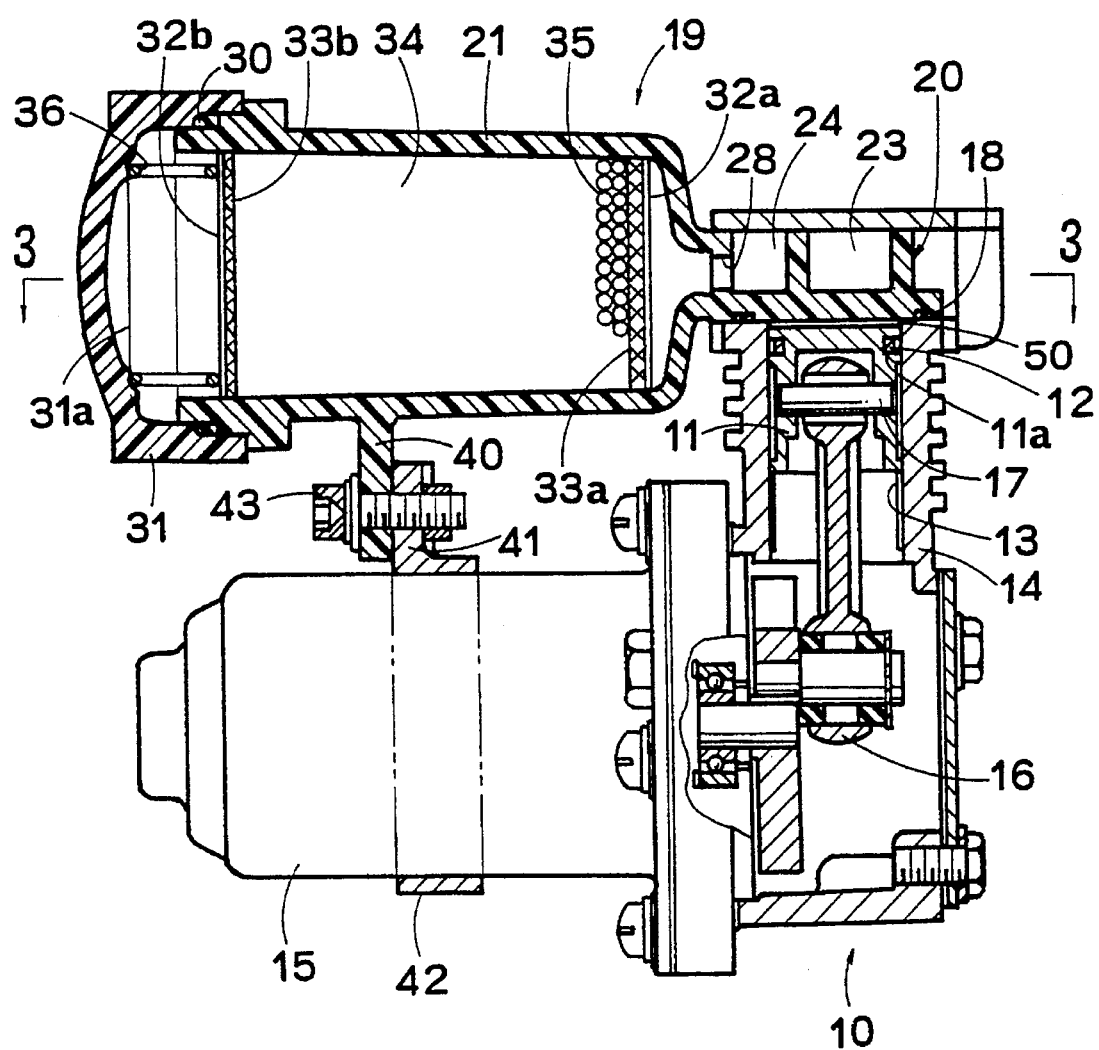
FIG. 2 is a sectional view of a compressed air control apparatus according to an embodiment of the present invention.
Figure 3:
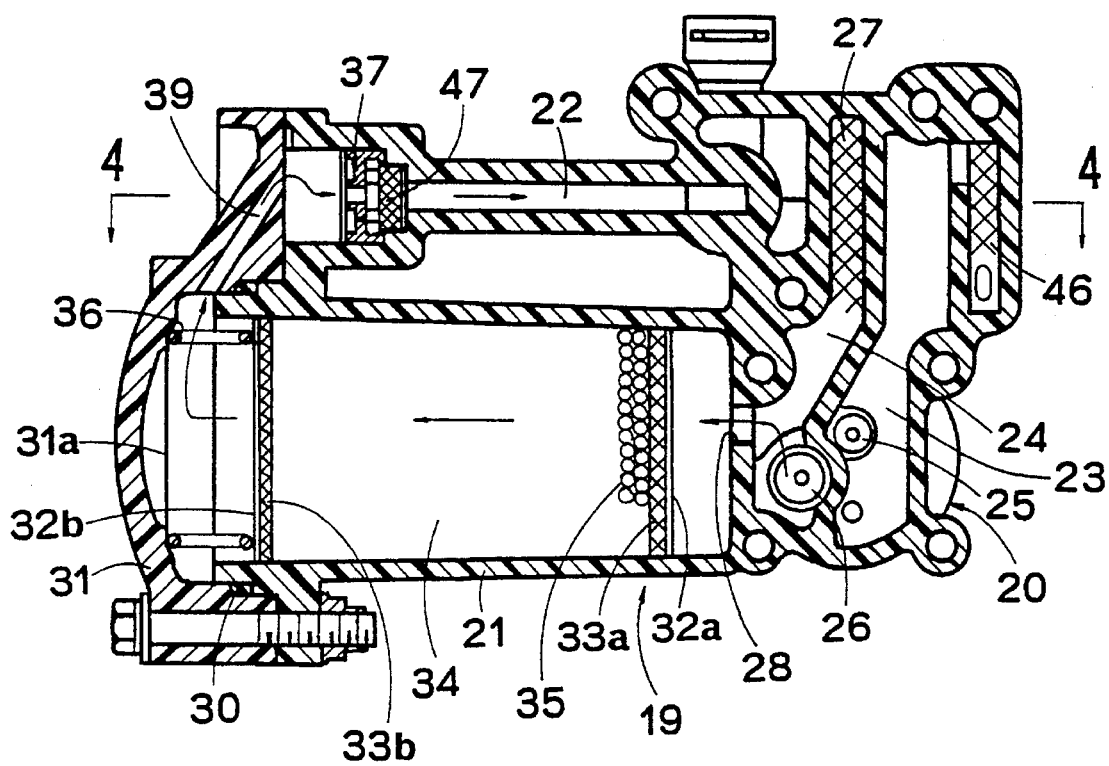
FIG. 3 is a sectional view taken along the line 3—3 in FIG. 2.
Figure 4:
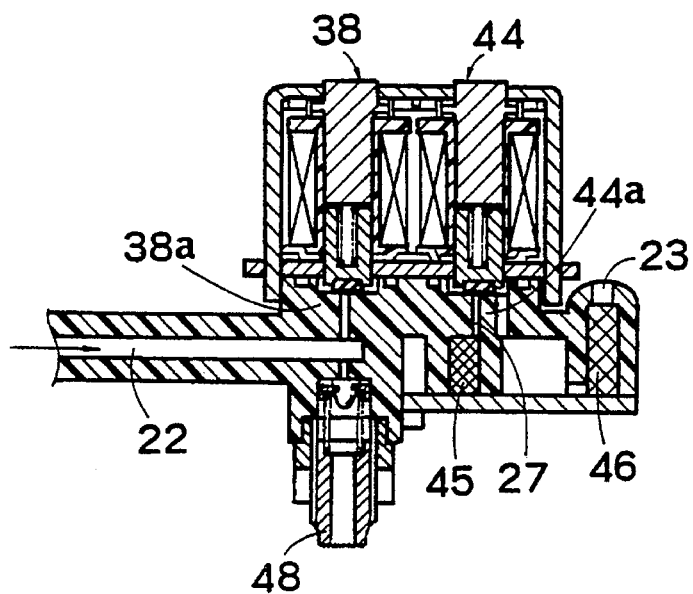
FIG. 4 is a sectional view taken along the line 4—4 in FIG. 3.

As shown in FIG. 2, the compressor 10 includes a cylinder block 14 which is made of metal to define a cylindrical bore 13, and a piston 11 which is slidably received in the cylindrical bore 13. A circular groove 11a is formed around the periphery of the piston 11, and a piston ring 12 is fitted into the circular groove 11a. The piston 11 is connected to one end of a connecting rod 16 by a connecting pin 17, and slidably received in the cylindrical bore 13 with the piston ring 12 mounted around the piston 11. The other end of the connecting rod 16 is operatively connected to the motor 15, so that the piston 11 is driven by the motor 15 to reciprocate in the cylindrical bore 13. A cylinder head 20 is secured to an opening end of the cylinder block 14 to form a pressure chamber 50 between the piston 11 and the cylinder head 20 within the cylinder block 14. This cylinder head 20 is formed as a part of an integral housing 19, which further includes a dry housing 21, a supply valve housing 38a and an exhaust valve housing 44a, as shown in FIGS. 2 to 4. The integral housing 19 is made of synthetic resin having a good heat resistance property, such as PPS (polyphenylene sulfide) or the like, to integrate the cylinder head 20, dry housing 21, supply valve housing 38a and exhaust valve housing 44a, as shown in FIGS. 2 to 4. The dry housing 21 is integrally formed with a bracket 40 at its outer surface, as shown in FIG. 2. On the motor 15 is slidably mounted a belt 42 which integrates a bracket 41. The brackets 40 and 41 are bolted together by a bolt 43, so that the dry housing 21 is secured to the motor 15, which is secured to the cylinder block 14.

In a section of the integral housing 19 to provide the cylinder head 20, an intake passage 23 is formed to intake the air from the atmosphere, and a discharge passage 24 is formed to discharge the compressed air which is produced in the pressure chamber 50. In the intake passage 23, there is disposed the intake valve 25 which opens when the pressure in the pressure chamber 50 becomes less than a predetermined value. In the discharge passage 24, there is disposed the discharge valve 26 which opens when the pressure in the pressure chamber 50 becomes equal to or greater than a predetermined value, and which will be described later in detail referring to FIGS. 5 and 6.

As shown in FIGS. 2 and 3, the dry housing 21 is formed as a section of the integral housing 19 to provide a cylinder with its one end closed and the other end opened. In the closed end of the dry housing 21, a passage 28 is formed to communicate with the discharge passage 24, whereas the open end of the dry housing 21 is covered by a cap member 31 with an O-ring 30 disposed therebetween to provide an air tight seal. At both ends within the dry housing 21, there are disposed plates having a plurality of holes defined therein (hereinafter, referred to as perforated plates) 32a, 32b, which abut filter elements 33a, 33b, respectively. Therefore, the perforated plates 32a, 32b define the dry room 34 therebetween, in which a moisture absorbent 35 such as silica gel or the like is filled. A spring 36 is disposed between the perforated plate 32b and an end portion 31a of the cap member 31 for biasing the moisture absorbent 35 in the axial direction, so that elements of the moisture absorbent 35 tightly contact with each other, and the pressure in the dry housing 21 will not be affected by introducing thereinto the compressed air.

In parallel with the dry housing 21 as shown in FIG. 3, is formed an air passage 22, at one end of which the valve member 37 is disposed together with a filter element 47, and at the other one end of which the supply solenoid valve 38 is disposed as described later in detail. The air passage 22 is communicated with the dry housing 21 at the end portion 31a, through a passage 39 and the valve member 37, so that the compressed air which is dried in the dry room 34 can be introduced into the air passage 22. The valve member 37 includes the check valve 37a as shown in FIG. 1, which opens when the compressed and dried air is supplied to the pneumatic suspension unit AS, and includes the orifice 37b as shown in FIG. 1, through which the compressed air is discharged into the dry room 34.

The supply solenoid valve 38 is disposed at the other one end of the air passage 22 as shown in FIG. 4 to communicate with the air passage 22 and control the compressed air supplied to the pneumatic suspension unit AS. The supply solenoid valve 38 includes the supply valve housing 38a which is integrally formed with the integral housing 19, and next to which the exhaust valve housing 44a of the exhaust solenoid valve 44 is integrally formed. The exhaust solenoid valve 44 is provided for controlling the compressed air exhausted from the pneumatic suspension unit AS. Opposite to the supply solenoid valve 38, the relief valve 48 is disposed to communicate with the air passage 22, and it is so arranged that the relief valve 48 opens to the atomosphere, when the pressure in the air passage 22 exceeds a predetermined pressure thereby to decrease the pressure in the air passage 22. With the end portion of the air passage 22 and the exhaust port 27 formed nearby, the supply solenoid valve 38 and the exhaust solenoid valve 44 may be formed integrally to provide a dual-type solenoid valve, which serves as a single solenoid valve unit. The compressed air in the discharge passage 24 may be discharged to the atmosphere from the exhaust port 27 through the filter element 45, with the exhaust solenoid valve 44 opened.

Figure 5:
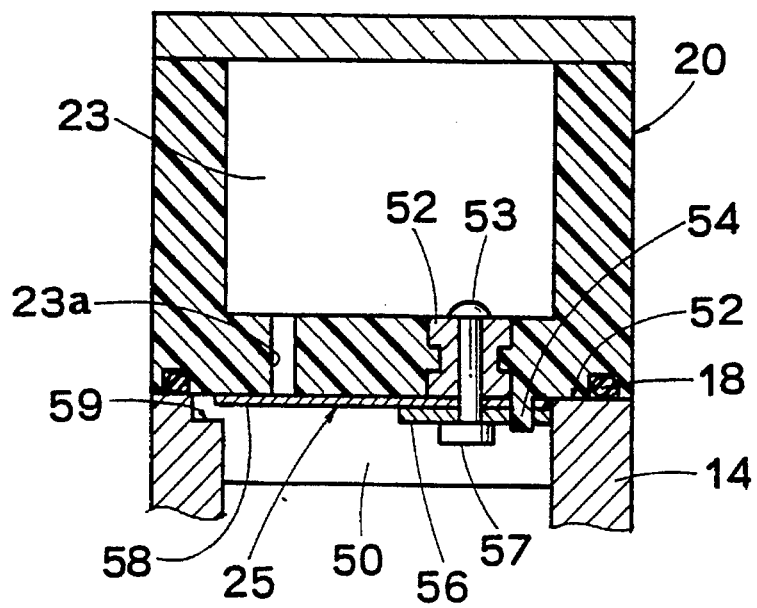
FIG. 5 is an enlarged sectional view of an intake valve of a compressor in an embodiment of the present invention.
Figure 6:
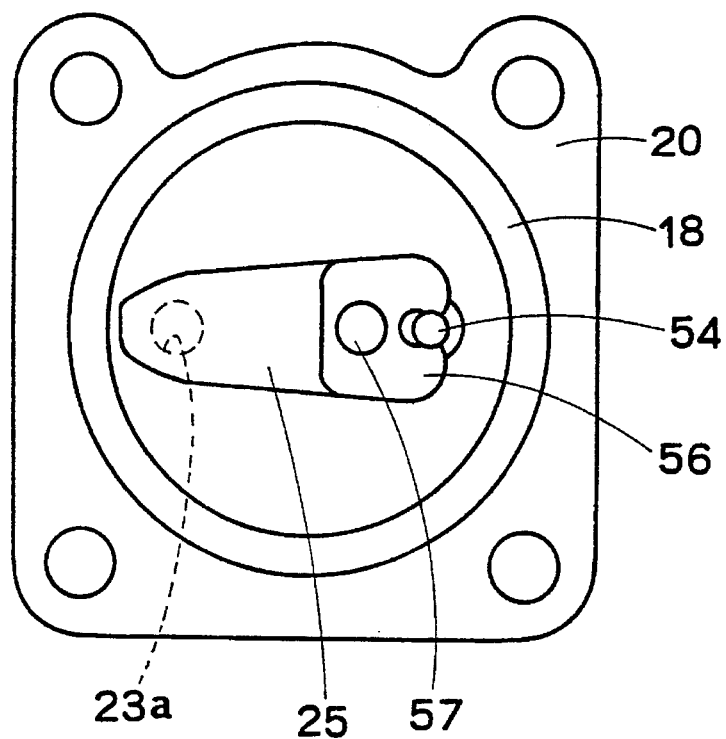
FIG. 6 is a sectional view of the intake valve in FIG. 5 as viewed from the downward.

As shown in FIGS. 5 and 6, the cylinder head 20 forms the intake passage 23, the sectional plan view of which is shown in FIG. 3, and an intake aperture 23a which communicates the intake passage 23 with the pressure chamber 50. A metal bush 52 is integrally molded to the cylinder head 20, and arranged to receive on its central axis a rivet 53, which caulks one end of a reed type intake valve 25. The other end of the intake valve 25 is arranged to open or close the intake aperture 23a. The pressure chamber 50 is defined between the piston 11 and the cylinder head 20 within the cylinder block 14, and can be communicated with the atmosphere, through the intake passage 23 which is formed in the cylinder head 20, the intake aperture 23a and the intake valve 25, and also can be communicated with the pneumatic suspension unit AS as shown in FIG. 1, through the discharge valve 26 and the discharge passage 24.

The intake valve 25 is biased to abut the periphery of one opening of the intake aperture 23a which is opened to the pressure chamber 50, so that the air is allowed to flow from the intake passage 23 into the pressure chamber 50, and the counter flow of the air is blocked. Between a head portion 57 of the rivet 53 and the intake valve 25, there is disposed a spacer 56 which protects the intake valve 25 from being deteriorated by caulking. A projection 54 is integrally formed on the cylinder head 20 to prevent the intake valve 25 from being rotated about the rivet 53. At an opening end 52 of the cylinder block 14, there is formed a recess 59 which receives a free end 58 of the intake valve 25 and blocks the movement of the free end 58 thereby to allow the intake valve 25 to move within a predetermined opening angle of the intake valve 25.

In operation, when the height of the vehicle is to be raised, for example, the exhaust solenoid valve 44 is held to be closed so as to shut off the exhaust port 27, while the supply solenoid valve 38 is energized to open the air passage 22. At the same time, the compressor 10 is operated to move the piston 11 downward within the cylindrical bore 13 as shown in FIG. 2, so that the pressure in the pressure chamber 50 is decreased. When the pressure in the pressure chamber 50 becomes less than the predetermined pressure, the intake valve 25 is opened to suck the air from the intake passage 23. On the contrary, when the piston 11 moves upward within the cylindrical bore 13, the air in the pressure chamber 50 is compressed. Consequently, when the pressure in the pressure chamber 50 becomes greater than the predetermined pressure, the discharge valve 26 is opened to discharge the compressed air into the discharge passage 24, so that the compressed air flows into the dry housing 21 via the passage 28. Then, the compressed air flows into the dry room 34 through the filter element 33a via the apertures of the perforated plate 32a. In the dry room 34, any moisture content in the compressed air is absorbed by the moisture absorbent 35 to dry the compressed air, which further flows to reach the end portion 31a of the cap member 31 through the filter element 33b and the perforated plate 32b. Then, the compressed air flows toward the valve member 37, which is disposed in the air passage 22, through the passage 39, and opens the check valve 37a to flow into the air passage 22 then to the supply solenoid valve 38. Because the supply solenoid valve 38 has been energized to open the air passage 22, the compressed air is supplied to the pneumatic suspension unit AS thereby to raise the height of the vehicle in accordance with the conventional manner. When the height of the vehicle reaches a desired height, the motor 15 is stopped and the supply solenoid valve 38 is de-energized to close the air passage 22.

In the case where the height of the vehicle is to be reduced, the supply solenoid valve 38 and the exhaust solenoid valve 44 are energized to open the air passage 22 and the exhaust port 27, so that the compressed dry air in the pneumatic suspension unit AS is discharged to the air passage 22, and further to the passage 39 and then the end portion 31a of the cap member 31 through the orifice 37b of the valve member 37, by which the pressure of the compressed air is decreased. Thus, the dry air, the pressure of which is decreased, is flown into the dry room 34, and discharged to the discharge passage 24. Because the pressure in the dry room 34 is decreased to reach nearly the atmospheric pressure, the dry air flown into the dry room 34 absorbs the moisture which has been absorbed by the moisture absorbent 35 and the filter elements 33a, 33b, so that the moisture absorbent 35 and the filter elements 33a, 33b are refreshed. Consequently, the air is discharged to the atmosphere through the energized exhaust solenoid valve 44 and the exhaust port 27, without leaking into the pressure chamber 50 because the discharge valve 26 has been closed.

According to the present embodiment as described above, only a single supply solenoid valve 38 is disposed for supplying the compressed air to the pneumatic suspension unit AS. This is because the supply solenoid valve 38 is provided for controlling simultaneously both of the pneumatic suspension units AS, AS, which are mounted on the rear wheels in such a pneumatic height control apparatus that requires no height control for either of the front absorbers. In order that the height control is also made with respect to the front wheels, however, another solenoid valve may be installed on the apparatus when needed, or integrally formed with the apparatus. According to the present embodiment, the integral housing 19 is made of synthetic resin, so that its heat resistance property is inferior to that of the apparatus using a metallic cylinder head. Therefore, the compression ratio of the compressor is reduced so as to decrease the temperature of the compressed air. The defect resulted from the decrease of the compression ratio can be recovered by increasing the rotational speed of the motor 15, whereby the influence upon the resin caused by the heat of the compressed air can be prevented effectively.

It should be apparent to one skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A compressed air control apparatus for supplying compressed air to a pneumatic actuator, comprising:

a compressor that includes a cylinder with an open end, a head member secured to the open end of said cylinder, a piston slidably positioned in said cylinder to form a pressure chamber within said cylinder between the head member and the piston for generating compressed air, an intake valve for introducing air into said pressure chamber, and a discharge valve for discharging compressed air from the pressure chamber;

dry means disposed in a dry housing for drying the compressed air discharged from said compressor;

supply valve means disposed in a supply valve housing for controlling the compressed air to be supplied to said pneumatic actuator;

exhaust valve means disposed in an exhaust valve housing for controlling the compressed air to be discharged from said pneumatic actuator, said drying housing, supply valve housing and exhaust valve housing being disposed in the vicinity of the head member, said head member, dry housing, supply valve housing and exhaust valve housing being integrally formed of synthetic resin to define a single piece integral housing.

2. The compressed air control apparatus as claimed in claim 1, wherein said dry housing has a hollow interior and an open end, and including a cap member connected to said open end of the dry housing with a dry chamber being defined in the hollow interior of the dry housing, said cap member having a passage, one end of which is communicated with said dry chamber, and the other end of which is to be communicated with said pneumatic actuator.

3. The compressed air control apparatus as claimed in claim 2, wherein said integral housing forms therein an intake passage for communicating said intake valve of said compressor with the atmosphere, and an exhaust passage for communicating said discharge valve of said compressor with both of said dry chamber and said exhaust valve means.

4. The compressed air control apparatus as claimed in claim 1, wherein said supply valve means and said exhaust valve means comprise a supply solenoid valve and an exhaust solenoid valve, respectively, which are assembled together to form a single solenoid valve unit, the supply solenoid valve and the exhaust solenoid valve each having an axis, the axis of the supply solenoid valve being parallel to the axis of the exhaust solenoid valve.

5. The compressed air control apparatus as claimed in claim 1, wherein a metallic mounting member is integrally molded to said integral housing in the vicinity of said intake valve, and wherein said intake valve includes a reed valve, one end portion of which is secured to said metallic mounting member.

6. The compressed air control apparatus as claimed in claim 5, wherein said metallic mounting member comprises a bush which is molded integrally to said integral housing, and wherein said reed valve is secured to said bush by a securing member.

7. The compressed air control apparatus as claimed in claim 5, wherein said compressor includes a metallic cylinder having an opening end thereof formed with a recess engageable with the other end portion of said reed valve, said recess allowing the other end portion of said reed valve to move within a predetermined opening angle of said reed valve.

8. The compressed air control apparatus as claimed in claim 5, wherein said integral housing has an engaging portion formed integrally therewith for restraining said reed valve from rotating around said securing member.

9. The compressed air control apparatus as claimed in claim 8, wherein said engaging portion comprises a projection which is integrally formed on said integral housing and engaged with said reed valve.

10. A compressed air control apparatus for supplying compressed air to a pneumatic actuator, comprising:

a compressor that includes a cylinder which is open at one end, a piston slidably disposed in the cylinder to define a pressure chamber within the cylinder between the piston and the one end of the cylinder with movement of the piston generating compressed air, an intake valve for introducing air into the pressure chamber, and a discharge valve for discharging compressed air from the pressure chamber;

a dry housing in communication with the pressure chamber, said dry housing being made of synthetic resin and containing drying means for drying air discharged from the pressure chamber, an integral portion of the dry housing that is formed in one piece with the dry housing forming a cylinder head that covers the open end of the cylinder, an integral portion of the dry housing that is formed in one piece with the dry housing forming a supply valve housing, an integral portion of the dry housing that is formed in one piece with the dry housing forming an exhaust valve housing;

a supply valve positioned in the supply valve housing for controlling compressed air supplied to the pneumatic actuator; and an exhaust valve positioned in the exhaust valve housing for controlling compressed air discharged from the pneumatic actuator.

11. A compressed air control apparatus according to claim 10, including an intake passage formed in a portion of the dry housing that is integral with and formed in one piece with the dry housing, said intake valve being positioned in said intake passage and said intake passage being in communication with the atmosphere.

12. A compressed air control apparatus according to claim 10, including a discharge passage formed in a portion of the dry housing that is integral with and formed on one piece with the dry housing, said discharge valve being positioned in the discharge passage.

13. The compressed air control apparatus as claimed in claim 10, wherein said supply valve and said exhaust valve are assembled together to form a single solenoid valve unit, the supply valve and the exhaust valve each having an axis, the axis of the supply valve being parallel to the axis of the exhaust valve.

* * * * *